United States Patent [19]

Moore

[11] 4,041,266

[45] Aug. 9, 1977

[54] SENSOR AND TRAY ARRANGEMENT

[75] Inventor: Donald G. Moore, Glencoe, Ill.

[73] Assignee: Chemetron Corporation, Chicago, Ill.

[21] Appl. No.: 624,633

[22] Filed: Oct. 21, 1975

Related U.S. Application Data

[63] Continuation-in-part of Ser. No. 380,487, July 18, 1973, Pat. No. 3,935,415, and a continuation-in-part of Ser. No. 300,763, Oct. 25, 1972, Pat. No. 3,936,626.

[51] Int. Cl.² .............................................. H05B 9/06
[52] U.S. Cl. ............................. 219/10.55 E; 206/504; 426/241
[58] Field of Search ............... 224/48 R; 219/10.55 D, 219/10.55 E, 10.55 M, 10.55 F; 174/35 GC; 335/36; 426/107, 241; 206/504

[56] References Cited

U.S. PATENT DOCUMENTS

| | | | |
|---|---|---|---|
| 2,886,225 | 5/1959 | Clarke | 224/48 R |
| 3,271,169 | 9/1966 | Baker et al. | 219/10.55 E |
| 3,454,947 | 7/1969 | Wesch et al. | 174/36 |
| 3,525,841 | 8/1970 | Haagensen et al. | 219/10.55 D |
| 3,651,300 | 3/1972 | Haagensen | 219/10.55 D |
| 3,767,884 | 10/1973 | Osepchuk et al. | 219/10.55 D |
| 3,843,859 | 10/1974 | Klemp et al. | 219/10.55 D |
| 3,854,022 | 12/1974 | Moore | 219/10.55 E |

Primary Examiner—Robert J. Spar
Assistant Examiner—Kenneth Noland
Attorney, Agent, or Firm—N. M. Esser

[57] ABSTRACT

A tray for use in an electromagnetic oven supplying differing quantities of electromagnetic energy to a variety of load items which are located within the oven cavity. A food or material bearing tray inserted into the oven positions a conductive energy shield to interfit with elements on the tray to isolate selected items from the electromagnetic energy. The conductive shield cooperates with a shaped interior wall of the oven to provide a desired non-uniform distribution of electromagnetic energy over those regions of the tray which are not shielded. An improved sensor assembly located on the tray controls an assembly in the oven to inhibit and terminate the heat cycle as desired. The tray further includes conductive base strips with upstanding flange members defining the shielded region with the base strips recessed into the surface of the tray to prevent energy from entering into this shielded area. Where the upstanding flanges meet the base strip, a molded lip is provided in the tray surface to form a seal preventing food and miscellaneous other materials from accumulating or entering this area. The tray is provided with extending portions or feet located at the edges of the tray that contact supporting rails in a storage rack upon insertion and removal. The feet facilitate handling of the loaded trays when stacked and maintain the trays in a nearly level manner during insertion and removal. The feet have a surface designed to cooperate with the contacting surfaces of the storage racks.

21 Claims, 7 Drawing Figures

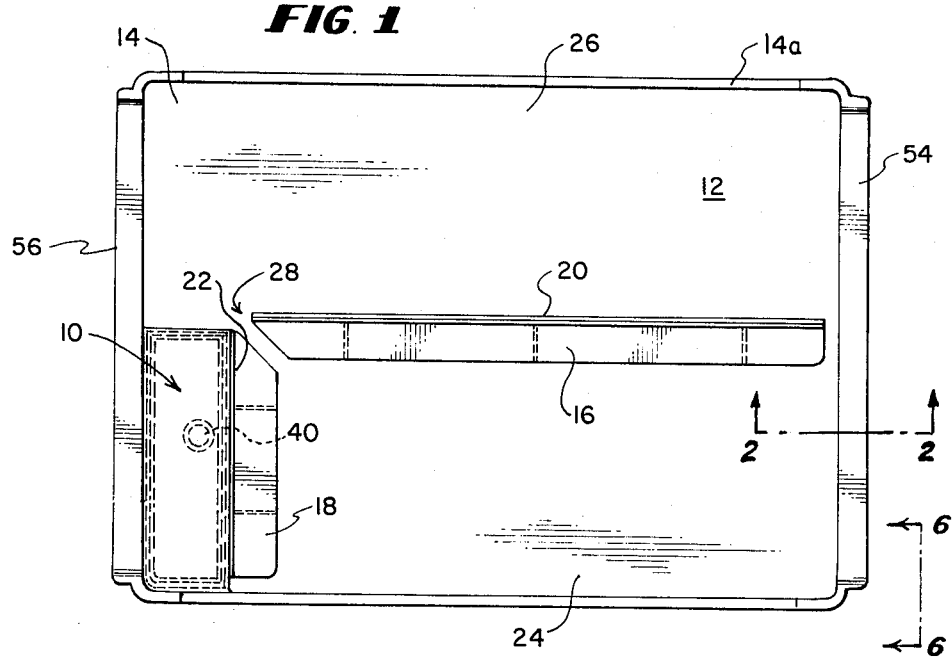
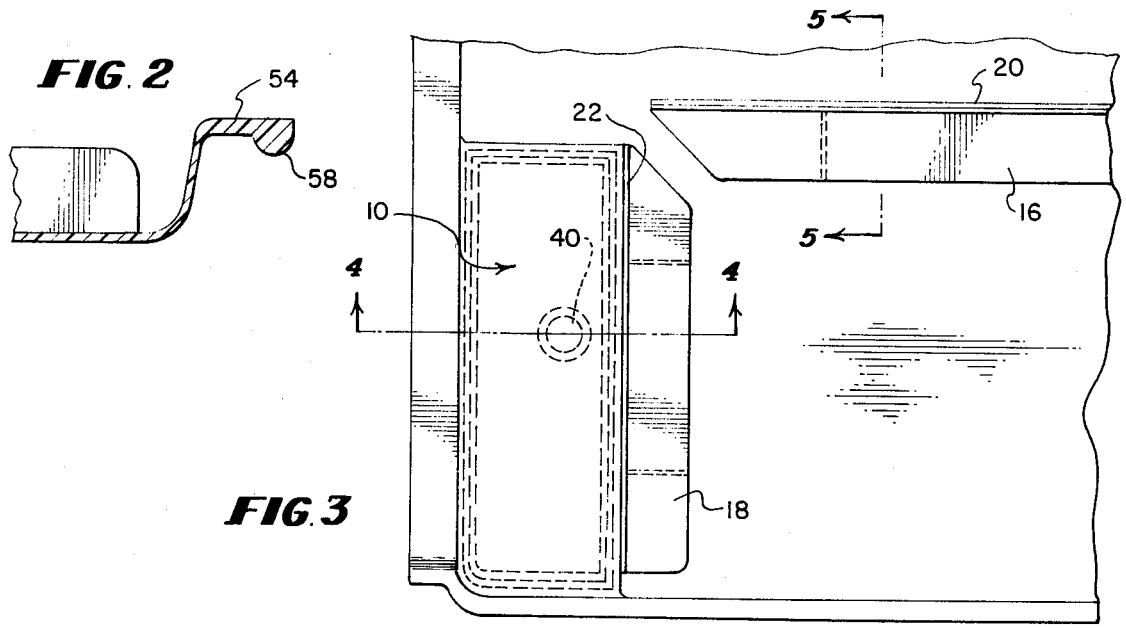
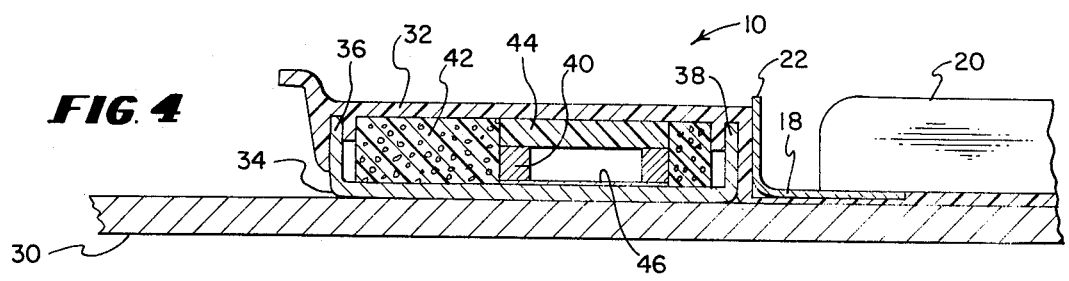

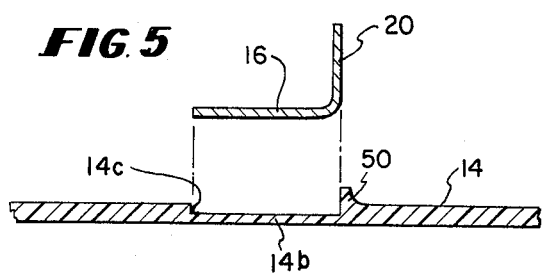
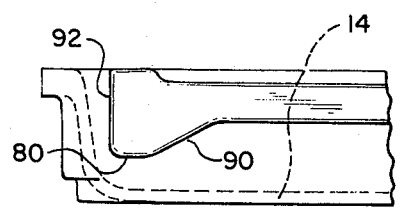
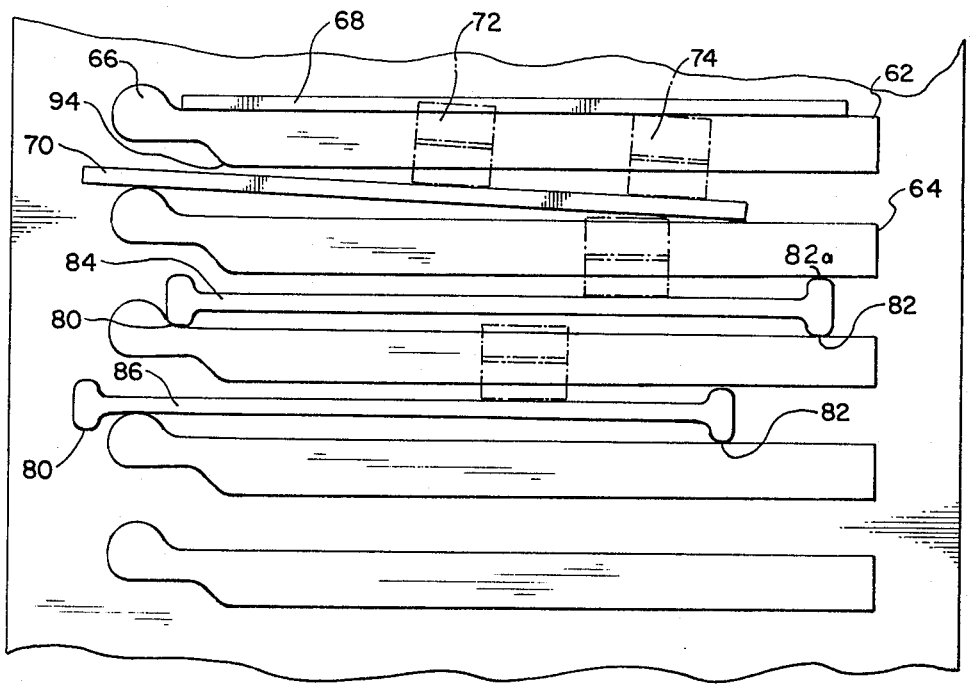

SENSOR AND TRAY ARRANGEMENT

CROSS REFERENCES

This application is a continuation in part of application Ser. No. 380,487, filed on July 18, 1973, now U.S. Pat. No. 3,935,415 issued Jan. 27, 1976, and a continuation in part of application Ser. No. 300,763 filed Oct. 25, 1972, now U.S. Pat. No. 3,936,626 issued Feb. 3, 1976. The now issued U.S. Pat. No. 3,935,415 patent is also based on a continuation-in-part of the application resulting in the U.S. Pat. No. 3,936,626 patent. The present application and the above issued U.S. Patents are all assigned to a common assignee.

BACKGROUND OF THE INVENTION

A. Field of the Invention

The present invention relates most generally to the field of heating and serving systems and more particularly to an improved tray which is inserted into an electromagnetic heating system which selectively heats various elements of a load, such as a complete meal or the like, in a single operation.

B. DESCRIPTION OF THE PRIOR ART

In institutions, such as hospitals, it is desirable to provide a system whereby a complete meal may be brought up to serving temperature in a single, quick operation. If this can be done, the meals may be prepared in an assembly line fashion on week days during normal working hours and then they may be kept refrigerated until the time when they are to be served.

A typical meal normally includes some food items which require heating before they may be served and other food items which are preferably served cold. For example, the salad and dessert portions of a meal are preferably served cold. The main entree of a meal is preferably served hot. If a meal includes coffee or tea, the coffee or tea is preferably served very hot.

A conventional oven ordinarily supplies heat energy to every portion of the meal. In an electromagnetic oven, on the other hand, any food item that is completely enclosed in an electrically conductive wrapper or shield is not heated. It is, therefore, possible to heat a complete meal in a microwave oven without heating, for example, a desert such as ice cream that is wrapped in aluminum foil or otherwise shielded. However, wrapping all items such as deserts, salads and beverages such as milk, in foil adds considerably to the cost of preparing a meal. Difficulties may also arise any time a shielded item is placed into an electromagnetic oven, because the shield distorts the electromagnetic field within the oven. Arcing can also result, especially if the shielding has any sharp edges or is positioned adjacent a conductive wall of the oven chamber. An electromagnetic oven heating system and shield for accomplishing the above described meal preparation system are described in U.S. Pats. No. 3,854,021 which issued to Donald G. Moore, et al. on Dec. 10, 1974 and 3,854,022 which issued to Donald G. Moore on Dec. 10, 1974. These patents are hereby incorporated by reference for all purposes and reference can be made to these patents for a more complete description of the background of the present invention.

In some applications, the level of microwave energy in the vicinity of the sensing device may be relatively low and more efficient coupling of energy to the sensing device is required in order that the sensing device reach its Curie point by the time the food items on the tray reach their desired serving temperatures.

Further, a tray that facilitates handling, as in insertion and removal from storage racks when serving the meals, is also required to insure the efficiency of the overall institutional feeding plan. Clearance or height problems in storage racks due to tilting and tall objects on the trays causes inefficiency and loss of food. Existing trays fabricated from some materials also allow an undersirable rise in temperature in the shielded areas that detracts from the overall optimization of the feeding plan and appeal of the meals.

SUMMARY OF THE INVENTION

Accordingly, it is an object of the present invention to provide an improved tray that permits a minimum amount of electromagnetic energy to enter a selected shielded area of the tray so that items in said area experience a minimum temperature rise while other items outside said area are heated to their desired respective temperatures.

Another object is to provide a tray with improved edge design to provide ease of handling by personnel and that facilitates insertion and removal of loaded trays from storage or carrying racks.

Another object is to provide a tray that prevents spilled food or other materials from collecting or accumulating in crevices formed by the intersection of shielding flanges or other upstanding metal portions with the tray base.

A further object of the invention is to provide a sensing assembly which incorporates more efficient coupling of microwave energy to the sensing device and hence can function properly at relatively low energy levels within the oven.

These and other objects of the present invention are efficiently achieved by providing a generally rectangular planar tray on which food items to be heated are positioned and the tray is placed in the cavity of a microwave oven. The tray is molded in one piece and is provided with a bottom opening recess in one corner thereof. A replaceable sensing assembly is mounted in said recess and includes a ferromagnetic sensing member substantially enclosed by electrically nonconductive material. An electrically conductive nonmagnetic member is positioned below the sensing member to control the coupling of energy to the sensing member which is reflected upwardly from the conductive floor of the oven. By providing such an assembly, optimum shielding for a particular sensing member may be provided and sensing members having different Curie points may be employed while utilizing a main tray of standard construction.

In one embodiment, the tray includes conductive base members with upstanding flange portions defining an area of the tray adapted to interfit with an energy shield within the oven to isolate selected items on the tray from electromagnetic energy. The conductive base members are recessed into the surface of the tray so that a minimum thickness of the tray material is present between the conductive base members on the upper surface of the tray and the conductive deck on which the tray rests when in the oven. This arrangement minimizes the leakage of energy into the shielded area on the tray when the tray is placed in the oven. A molded lip is formed on the tray surface where the upstanding flange portion meets the base portion to prevent food and other materials from entering or accumulating at the interface between the tray surface and the flange.

The edges of the tray are provided with contoured lips to facilitate grasping and handling of the tray by personnel. Leveling extensions or feet are provided at either end of the lip on each side of the tray which cooperate with the support rails of a tray storage rack to retain the tray within the rack while it is being moved. These extensions also provide additional clearance of food items on the stacked trays and maintain the tray in a more nearly level position during insertion and removal.

The foregoing, as well as other objects, features and advantages of the present invention, will become more apparent from the following detailed description taken in conjunction with the appended drawings. The features of novelty which characterize the invention are pointed out with particularity in the claims annexed to and forming a part of the specification.

BRIEF DESCRIPTION OF THE DRAWINGS

For a better understanding of the invention, frequent reference will be made to the drawings wherein:

FIG. 1 is an overall plan view of a tray constructed in accordance with the teachings of the invention;

FIG. 2 is a partial sectional view of the tray shown in FIG. 1 taken along lines 2—2 in FIG. 1 to illustrate the contoured lip along the edge of the tray to facilitate handling of the tray;

FIG. 3 is an enlarged partial view of the tray shown in FIG. 1 to illustrate the improved sensing assembly and the upstanding flange members that cooperate with the energy shield within the microwave oven;

FIG. 4 is a sectional view of the tray shown in FIG. 3 taken along lines 4—4 of FIG. 3 to illustrate the details of the sensing assembly;

FIG. 5 is a sectional view of the tray shown in FIG. 3 taken along lines 5—5 of FIG. 3 to illustrate the recessed base portions with upstanding flange members and to illustrate the molded lip formed in the tray to prevent accumulation of food and materials;

FIG. 6 is a partial side view of the tray shown in FIG. 1 taken along lines 6—6 of FIG. 1 to illustrate the extending portions or feet of the tray edges that facilitate insertion into and removal from a tray rack; and FIG. 7 is a partial side view of a suitable tray rack for carrying a plurality of trays and diagrammatically depicts the trays in various positions of insertion and removal.

DESCRIPTION OF THE PREFERRED EMBODIMENT

With reference to FIGS. 1, 3 and 4 there is illustrated a new and improved sensor assembly, referred to generally as 10, carried by the new and improved tray, referred to generally as 12, both constructed in accordance with the principles of the present invention. The tray 12 with associated sensor assembly 10 of the present invention is utilized in conjunction with an electromagnetic oven to heat food items carried by the tray to the desired serving temperatures, as described in more detail in U.S. Pat. Nos. 3,854,022 and 3,854,021 referred to above.

The improved tray 12, FIG. 1, is of generally rectangular shape and has a bottom portion 14 and upturned edges 14a. Two conductive base strips 16 and 18 secured to the upper surface of the bottom 14 support a pair of conductive upstanding flanges 20 and 22, respectively. The upstanding flanges 20 and 22 act as shielding members, in cooperation with a movable shield member provided in the microwave oven so as to define a first zone 24 within which items which are not to be heated may be placed and a second zone 26 in which various items to be heated may be placed, as described in more detail in U.S. Pat. No. 3,854,021 referred to previously. The base strips 16, 18 cooperate with the conductive deck 30 of the microwave oven to provide an energy seal which minimizes leakage of microwave energy into the zone 24. The flanges 20 and 22 have dimensions including radii which are selected to reduce field concentrations and a slot 23 is provided between the base strips 16, 18 to minimize concentration of microwave energy in the area of the corner of the movable shield associated with the microwave oven. The body of the tray 12 is preferably constructed from sheet molded polyester fiberglass which has excellent mechanical strength and has better electrical breakdown characteristics than bulk molded polyester fiberglass. While sheet molded polyester fiberglass has these desirable qualities, it is somewhat less lossy and tends to admit more energy into the zone 24. This problem is, however, taken care of by recessing the base strips 16, 18 into the tray base 14, as will be described in more detail hereinafter.

The illustrated sensor assembly 10 comprises a cup-shaped housing 34 of plastic material which is provided with upstanding rim portions 36, 38 which are adapted to fit in grooves formed in a raised portion 32 of the tray base 14. The raised portion 32 thus defines a bottom opening recess which is adapted to receive the housing 34. The housing 34 carries the sensing element 40 of the assembly 10 which is fabricated of ferromagnetic material such as a ferrite. The ferromagnetic element 40, which is formed in the shape of a ring, is disposed near the bottom of the assembly 10 and is positioned by an electrically nonconductive member 42. Member 42 is formed in a generally rectangular parallelepiped shape and has a disc-shaped hole or opening in its central portion to accommodate the sensing element 40. The position of the hole in the member 42 may be readily varied to change the location of the sensing element 40 on the tray 12 without changing any of the other components of the assembly 10. With this arrangement various energy absorbing conditions within the same or different ovens may be accommodated. A disc-shaped member 44 is positioned over the sensing element 40 and complements the opening or material removed from element 42 to substantially enclose and interfit with the sensing element 40 with a minimum of air space along the interfaces. A nonmagnetic but electrically conductive disc 46 is positioned on the bottom surface of the sensing element 40 so as to completely cover the bottom plane of the sensing member and is located between the sensing member and the housing 34. The conductive disc 46 may be fabricated from aluminum foil or aluminum tape and controls the amount of electromagnetic energy which enters the sensing element 40 through the housing 34. The ferromagnetic element 40, for purposes of illustration and not in a limiting sense, may be a FERROXCUBE or NORTH AMERICAN PHILLIPS 3-E type toroid with a Curie point of from 125° F - 135° F. The approximate dimensions of the toroid in inches are a diameter of 1.15; a thickness of .295; and an inner radius of .374. The disc 46 may be fabricated from aluminum tape approximately five-thousandths of an inch thick and of slightly larger diameter than the elements 40 so as to follow slightly curved bottom edge of the element 40.

The amount of microwave energy absorbed per unit of time by the sensing element 40 has been found to be quite dependent upon the spacing of the element 40 from the conductive deck. Accordingly, the height of the rim portions 36, 38 is chosen so that the bottom surface of the housing 34 extends a slight distance below the bottom surface of the base portion 14, for example, a distance of .015 inch. This construction ensures that the bottom surface of the housing 34 always rests on the upper surface of the conductive deck 30 without any air space between the housing 34 and deck 30.

The members 42 and 44 are of heat resistant material and may both be made of polyurethane foam, for example. However, it has been found that when the member 44 is made of polysulfone, which is a solid material and has a relatively high dielectric constant, more energy is coupled to the sensing element 40 than when the member 44 is made of polyurethane foam. One explanation for this may be that the solid polysulfone member provides better matching between the impedance of free space (above the tray portion 32) and the impendance of the ferrite element 40. In any event, the material chosen for the member 44 affects quite markedly the amount of energy coupled to the element 40 and if it is desired to couple more energy per unit of time to the element 40, polysulfone or some similar material appears to be preferable. It is also noted that with the construction of the present invention the ferrite member 40 is substantially enclosed by nonmagnetic and nonelectrically conductive material and hence is not greatly shielded from microwave energy in all planes and directions except from the bottom where it is substantially shielded by the electrically conductive disc 46.

As discussed generally heretofore, the design of the upstanding flange members 20 and 22 with their respective conductive base portions 16, 18 is important in minimizing leakage of microwave energy into the zone 24 of the tray 12. The load objects or food materials placed within zone 24 are those that are desired to be served at a much cooler temperature than those placed in zone 26 since zone 24 by means of flanges 20 and 22 and the energy shield carried by the oven effectively prevent the transmission of appreciable amounts of energy into zone 24. However, it has been found that when the tray 12 is constructed of high dielectric strength material, which is desirable from the standpoint of avoiding burning of the tray in the vicinity of the edges of the base strips 16, 18, the use of such high dielectric strength material materially increases the amount of energy transmitted through the tray base 14 between the strips 16, 18 and the deck 30 into the zone 24. In accordance with an important aspect of the invention such leakage is minimized by recessing the base strips 16, 18 into the tray base 14, as best illustrated in FIG. 5. Referring to this figure, the base 14 is provided with grooves 14c within which the base strips 16, 18 are secured so that the thickness of the tray material 14b between the flange 16 and deck 30 is substantially reduced. Preferably, the strips 16, 18 are secured in the grooves 14c by means of a silicone base adhesive, such as Dow Corning R.T.V. which is transparent to microwave energy. It has been found that when the tray base 14 has a thickness of .080 inch and the strips 16, 18 are recessed so that the region 14b has a thickness of 0.040 inch, the temperture rise within the zone 24 during a heating cycle of the microwave oven is approximately 50 percent less than the temperature rise experienced when the strips 16, 18 are placed on the top surface of the tray base 14.

If the base strips 16, 18 are connected together at their adjoining edges extreme care must be taken to insure that good electrical contact is provided at such joint, otherwise arcing and burning of the tray may occur in this area. In accordance with a further aspect of the invention a gap or slot 28 (FIG. 1) is provided between the strips 16, 18. This gap is also of critical dimensions. If gap 28 is too wide, an energy leak is formed into shielded region 24. On the other hand, if gap 28 is too narrow, the energy focuses on this point and can arc or break down the tray material in this area. Preferably the slot 28 has a width of approximately one-half inch. Preferably strips 16 and 18 are 40 mills thick, the depth of the recess 14b, to provide a smooth surface with tray surface 14 at the interface with strips 16 and 18.

A raised curved lip portion 50, extends from the tray surface 14 along the flange members 20 and 22 where they interface with the base portions 16, 18 respectively. The lip 50 adds rigidity to the flange members and is useful in preventing food or other material from accumulating between the flange member and the grooves 14c in the tray base 14. Materials such as food accumulating in this recess could, of course, cause contamination and/or cleaning problems.

To facilitate the handling of the trays by service personnel, the edges 54 and 56 of the tray, which are conventionally flat, horizontally-extending flanges, include on their bottom or lower surface a downwardly-extending lip or contoured circular extending portion 58 designed to facilitate grasping and holding by the human fingers, as best seen in FIG. 2.

Referring now to FIGS. 6 and 7, another problem in the handling of trays and the serving of meals is the storage and transportation of the trays from the position where the trays are heated to the locations where they are served. A partial side view of a storage rack to hold trays while moving the trays from location to location is shown in FIG. 7. Supporting rails are shown at various verticals levels, such as rails 62 and 64, which support the side rails of the trays on the top edges of the rails 62, 64. The support rails 62, 64 customarily include raised portions 66 at the front edge thereof, i.e. the edge of entry when the trays are first inserted, to allow the smooth insertion and removal of trays as well as to act as a stop to keep the trays from accidentally becoming dislodged from the rack. Conventional trays having flat side rails 68 and 70 are shown in various positions of insertion along the first two tiers or racks of the tray support system to illustrate the difficulties in inserting or removing the trays at random from a tray rack when tall objects such as milk cartons are carried by the trays. The flat tray 70 is shown in a partially removed or partially inserted position with another flat tray 68 disposed above tray 70. Tall objects 72 and 74 are shown located on tray 70 with the bottom edge of tray 68 being contacted by object 72 on tray 70. This prohibits further insertion or removal of the tray without either spilling the object 72 or jamming the trays and causes inefficiency in the overall serving of institutional meals.

In accordance with an important aspect of the present invention, enlarged rail portions of feet 80 and 82 are provided at the four corners of the tray 12 of the present invention, two such trays being shown at 84 and 86 in FIG. 7. As is evident from this figure, as soon as the tray is moved outwardly a slight amount so that the foot 80 is moved beyond the raised rail portion 66, the tray returns to a level position and remains level, due to engagement of the upper edge portions 82a of the back feet 82, with the bottom surfaces of the rails 62, 64 immediately thereabove, until the back feet 82 encounter the rail portions 66. At this point the milk carton on the tray 86 has been moved outwardly beyond the forward edge of the next higher tray 84 so that it is not upset when the feet 82 are moved upwardly past the rail portions 66. Since the milk carton is normally positioned near the back edge of the tray, in the zone 24, the slight tilting of the tray as the feet 80 are moved past the rail portions 66 does not cause the milk carton to be moved upwardly by an amount sufficient to interfere with tray removal.

The enlarged rail portions or feet 80, 82 which are diagrammatically shown in FIG. 7, are preferably of the shape shown in FIG. 6. Referring to this figure, the foot 80, for example, has a sloping edge 90 on the inner side of the foot 80 to allow smooth movement of the tray over the curved portion 66 of the support rails during insertion and removal. A nearly vertical portion 92 of the foot 80 provides some resistance to movement over the curved surface 66 when the tray is in a fully inserted position thereby eliminating the accidental slipping or removal of the tray due to small forces exerted on the tray. It will also be seen from FIG. 6 that the side rails 54, 56 (FIG. 1) of the tray are actually positioned somewhat above the tray bottom 14, although FIG. 7 diagrammatically shows the items such as the milk cartons 72, 74 located at the level of the tray side rails. The distance that feet 80, 82 project below the upper edge of the tray is limited by the point at which a tray contacts the bottom portion 94 of the support rail immediately above. This corresponds to foot 80 being at the highest point of curved surface 66 of the support rail below.

Since certain modifications, substitutions and alterations in the above-described construction will occur to those skilled in the art without departure from the scope of the invention, it is intended that all matter contained in the above description, or shown in the appended drawings will be interpreted as illustrative and not in a limiting sense.

What is claimed as new and desired to be secured by Letters Patent of the United States is:

1. A tray, for supporting and serving food items exposed to microwave energy, said tray arranged to carry a plurality of food items in distinct zones and in which zones are applied different amounts of microwave energy, said tray including means to prevent inadvertent transfer of food items during stacking, comprising:
    a tray base having an upper surface defining said zones, and said base being made of electrically non conductive material;
    flange means at the boundaries of said zones which comprises microwave energy shielding means for restricting the amount of microwave energy within a zone which energy is not intended to be directed into said shielded zone, and said base having a groove formed on said upper surface and receiving a portion of said flange means;
    microwave sensing assembly means in a recessed portion of said tray base for sensing the microwave energy incident on said tray; and
    supporting means positioned at the periphery of said tray base for maintaining said tray base in a horizontal plane during stacking.

2. A tray of claim 1 further including said tray base having upstanding edge portions and a raised portion defining a bottom opening recess in said tray, a cup-shaped sensing assembly including a housing adapted to fit into said tray recess, a mass of electrically nonconductive material in said housing, said mass having a cylindrical vertically extending opening therein, an annular sensing member positioned in said opening, and a cylindrical cover member positioned over said sensing member in said opening.

3. The combination of claim 1, wherein said mass of material is polyurethane foam.

4. The combination of claim 1, wherein said cover member is polyurethane foam.

5. The combination of claim 1, wherein said cover member is polysulfone.

6. The combination of claim 1, wherein said cover is made of a material which is effective to couple a substantial amount of energy to said sensing member when said tray is placed in a microwave oven.

7. The combination of claim 1, which includes a thin electrically conductive nonmagnetic member secured against the bottom surface of said sensing member.

8. The combination of claim 7, wherein said thin member is approximately 0.005 inch thick.

9. The combination of claim 7, wherein said thin member is aluminum foil.

10. The combination of claim 7, wherein said sensing member with attached nonmagnetic member is positioned directly on the bottom wall of said housing.

11. The combination of claim 1, wherein said housing when seated in said recess extends a slight distance below the bottom surface of said tray base.

12. A tray of claim 1 further including,
    an elongated base strip in contact with the upper tray surface defining said zones of the tray,
    said flange means including an upstanding flange member extending from said base strip and extending along at least a portion of the length of said base strip, and
    a raised lip formed in the tray surface and extending from said tray surface, said raised lip extending along the length of said upstanding flange member and contacting said flange member to affect a seal to prevent accumulation of material at the interface of said flange member and said tray surface.

13. A tray construction as recited in claim 12 wherein said raised lip includes an arcuate shaped surface extending along the side of the lip which is opposite said flange member, said arcuately shaped surface forming a smooth radius with the tray surface.

14. A tray construction as recited in claim 12 wherein said raised lip includes a substantially vertical surface on the side of the lip which contacts said extending flange member.

15. A tray of claim 1 being positioned on a conductive deck member and a movable shield is provided within the oven to shield a portion of said tray from microwave energy within the oven further including,
    said flange means including an elongated conductive member positioned within said groove and having an upstanding flange portion, said conductive member cooperating with said movable shield and said conductive deck to shield said portion of said tray, the amount of tray material beneath said groove being sufficiently small that a minimum amount of microwave energy is permitted to enter said portion of said tray.

16. A tray construction as recited in claim 15 wherein said tray material is sheet molded polyester fiberglass.

17. A tray of claim 1 further including a generally rectangular tray base portion having a contoured bottom rail extending along a substantial portion of two opposite edges of said tray, said contoured bottom rail including a lip to accomodate human fingers.

18. A tray construction as recited in claim 17 wherein said contoured bottom rail exhibits a cross sectional planar surface taken across the edges that is generally a semicircle.

19. A tray of claim 1 of generally rectangular shape adapted to be arranged along with a plurality of other similar trays in a storage rack having supporting side rails for a plurality of trays arranged one above the other, further including,
- a tray having a base portion and upwardly extending side walls,
- horizontal flange portions extending outwardly from opposite sides of said tray, and said supporting means including enlarged end portions on each end of said horizontal flange portions, said enlarged end portions being adapted to engage said storage rack side walls and extending downwardly from the bottom surface of said horizontal flange portions by an amount substantially equal to the height of said upwardly extending front edge portions of said side rails, whereby said tray is maintained substantially level as it is removed from said storage rack.

20. A tray construction as recited in claim 19 wherein said enlarged end portions have an inclined surface joining the bottom surface of said enlarged end portions and the bottom surface of said horizontal flange portions, thereby to facilitate insertion and removal of said tray over said upwardly extending side rail portions.

21. A tray construction as recited in claim 20 wherein upper edges of said enlarged end portions engage bottom surfaces of said side walls to keep said trays substantially level during removal of said trays.

* * * * *